(12) United States Patent
Potter

(10) Patent No.: US 7,464,450 B2
(45) Date of Patent: Dec. 16, 2008

(54) ATTACHMENT AND RELEASE APPARATUS AND METHOD

(75) Inventor: Raymond Gary Potter, Southbury, CT (US)

(73) Assignee: Kendro Laboratory Products, LP, Newton, CT (US)

( * ) Notice: Subject to any disclaimer, the term of this patent is extended or adjusted under 35 U.S.C. 154(b) by 261 days.

(21) Appl. No.: 11/144,940

(22) Filed: Jun. 6, 2005

(65) Prior Publication Data

US 2005/0221971 A1    Oct. 6, 2005

(51) Int. Cl.
*B23P 11/00* (2006.01)
*B04B 7/06* (2006.01)

(52) U.S. Cl. .............................. 29/428; 29/456; 29/434

(58) Field of Classification Search .................. 29/456, 29/434, 436, 428; 494/12, 16, 20, 33, 64, 494/84, 85; 210/232
See application file for complete search history.

(56) References Cited

U.S. PATENT DOCUMENTS

| | | | |
|---|---|---|---|
| 2,865,662 A | 12/1958 | Nurmse | 242/318 |
| 3,028,075 A | 4/1962 | Blum | 494/20 |
| 3,819,111 A | 6/1974 | Romanauskas et al. | 494/16 |
| 3,843,045 A | 10/1974 | Schmidt et al. | 494/27 |
| 3,961,745 A | 6/1976 | Wright | 494/9 |
| 4,010,890 A | 3/1977 | Wright | 494/37 |
| 4,344,563 A | 8/1982 | Romanauskas | 494/20 |
| 4,360,151 A | 11/1982 | Cowell et al. | 494/10 |
| 4,412,830 A | 11/1983 | Strain et al. | 494/12 |
| 4,435,169 A | 3/1984 | Romanauskas | 494/20 |
| 4,753,631 A | 6/1988 | Romanauskas | 494/9 |
| 4,850,951 A | 7/1989 | Cheng et al. | 494/16 |
| 5,344,380 A | 9/1994 | Chern et al. | 494/12 |
| 5,411,465 A | 5/1995 | Glen et al. | 494/16 |
| 5,443,438 A | 8/1995 | Wright et al. | 494/84 |
| 5,456,653 A | 10/1995 | Wright | 494/82 |
| 5,512,030 A | 4/1996 | Barkus | 494/16 |
| 5,558,616 A | 9/1996 | Barkus et al. | 494/12 |
| 5,681,257 A | 10/1997 | Letourneur | 494/12 |
| 5,897,482 A | 4/1999 | Lowe | 494/12 |
| 6,056,684 A | 5/2000 | Linder et al. | 494/12 |
| 6,063,018 A | 5/2000 | Letourneur | 494/12 |
| 6,149,570 A | 11/2000 | Lowe et al. | 494/12 |
| 6,665,924 B2 | 12/2003 | Schutz | 29/525.11 |
| 6,764,438 B2 | 7/2004 | Potter | 494/12 |
| 6,776,751 B2 | 8/2004 | Potter | 494/12 |
| 6,802,803 B2 | 10/2004 | Potter | 494/12 |
| 6,981,304 B2 * | 1/2006 | Potter | 29/450 |

(Continued)

FOREIGN PATENT DOCUMENTS

DE    3334655    4/1985

(Continued)

*Primary Examiner*—Essama Omgba
(74) *Attorney, Agent, or Firm*—Baker & Hostetler LLP

(57) ABSTRACT

An attachment and release apparatus for attaching a rotor to a centrifuge drive assembly and for attaching a cover to the rotor. The apparatus includes a knob, a cover wherein the knob has a plunger disposed therein. The apparatus also includes an adapter having detents and a drive spindle having detents. In addition, the apparatus has at least one adapter moveable element retained within a passage located on the knob and least one drive spindle moveable element retained within an additional passage located on the knob. The apparatus also includes a biasing element disposed around one end of the plunger.

19 Claims, 3 Drawing Sheets

U.S. PATENT DOCUMENTS

| | | | |
|---|---|---|---|
| 7,011,618 B2 * | 3/2006 | Potter | 494/12 |
| 7,081,081 B2 * | 7/2006 | Schutz et al. | 494/12 |
| 7,137,198 B2 * | 11/2006 | Potter | 29/889 |
| 7,300,396 B2 * | 11/2007 | Pitkamaki et al. | 494/15 |
| 7,311,652 B2 * | 12/2007 | Henne | 494/12 |
| 2003/0144124 A1 | 7/2003 | Schutz | 494/12 |
| 2003/0199380 A1 | 10/2003 | Potter | 494/12 |
| 2003/0199381 A1 | 10/2003 | Potter | 494/12 |
| 2004/0018928 A1 | 1/2004 | Schutz et al. | 494/12 |
| 2004/0220037 A1 | 11/2004 | Potter | 494/12 |
| 2004/0224831 A1 | 11/2004 | Potter | 494/12 |
| 2004/0229742 A1 | 11/2004 | Potter | 494/12 |

FOREIGN PATENT DOCUMENTS

| | | |
|---|---|---|
| DE | 3805894 | 3/1989 |
| DE | 3805896 | 3/1989 |
| JP | 58-6257 | 1/1983 |
| JP | 7-284695 | 10/1995 |
| JP | 7-328486 | 12/1995 |

* cited by examiner

ATTACHMENT AND RELEASE APPARATUS AND METHOD

FIELD OF THE INVENTION

The present invention relates to an attachment and release apparatus and method for use with a centrifuge assembly. More particularly, the present invention relates to an apparatus and method for attaching and detaching a rotor to a drive assembly and a cover to the rotor.

BACKGROUND OF THE INVENTION

Centrifuges typically include a housing with a centrifuge chamber, a rotor that support samples to be centrifuged, a rotor cover, a drive spindle connected to a motor and a chamber door. The rotor cover encloses the samples inside the rotor and provides an aerodynamic smooth surface to reduce air friction during operation. The rotor cover is moveable between an open and closed position while in the open position the rotor cover provides access to the rotor and while in the closed position the cover encases the rotor. The rotor is secured to the drive spindle that supports the rotor. The centrifuge chamber within which the rotor rotates is usually covered by the chamber door during centrifugation to protect the centrifuge operator from the spinning parts in the chamber: The chamber door also provides containment should there be a rotor failure.

During normal centrifuge operation, a liquid sample is disposed within a receptacle, usually a centrifuge sample tube, and the tube is placed within ports or holes located on the rotor. Thereafter, the rotor cover is placed in the closed position, covering the rotor and readying the rotor for operation.

In existing rotors, the rotor cover is designed as a separate piece or unit from the rotor and requires manual attachment and detachment for each use. One current method for attachment includes utilizing a captive nut on the rotor cover that is screwed onto a threaded post located on the center of the drive spindle of the rotor. Another current method includes utilizing clamping studs, each having threaded members, wherein the studs are first inserted into receiving portions on the rotor and drive spindle. The studs are then rotated several times to secure the cover to the rotor and the rotor to the drive spindle.

As previously described, current rotors have threaded clamping studs. Typically, one clamping stud is used to attach the cover to the rotor while another is used to attach the rotor to the drive spindle. These studs are oriented in series such that the rotor to drive spindle clamping stud must be disengaged first and then the cover to rotor clamping stud must be disengaged. The cover can then be removed to gain sample access. A problem that occurs in the operation of these covers is that they are time consuming and labor intensive to operate. Many employ multiple threaded parts that each are required to be rotated multiple times to either attach or detach the cover to the rotor and the rotor to the drive spindle. Each piece must be manipulated by the centrifuge operator in order to ensure the cover is securely attached to the rotor and the rotor to the drive spindle prior to centrifuge operation and subsequently disengaged after centrifuge use. This manipulation prevents the centrifuge operator from quickly starting the centrifuge operation and also gaining access to his or her samples quickly and efficiently after the centrifuge operation is complete.

In view of the foregoing, it is desirable to provide a rotor cover and rotor attachment apparatus and method for effectuating quick, efficient access or closure to the samples in the rotor of a centrifuge. It is also desirable to provide a rotor cover and rotor attachment apparatus and method for effectuating efficient attachment and release of the rotor to and from the drive assembly without removing the rotor cover from the rotor.

SUMMARY OF THE INVENTION

The foregoing needs are met, at least in part, by the present invention where, in one embodiment, an attachment and release apparatus for use with a centrifuge having a rotor and rotor attachment ring is provided. The apparatus includes a knob having a first portion and a second portion, wherein the first portion includes a first passage and the second portion includes a second passage. The apparatus also includes a cover that is disposed around the knob along with an adapter connected to the rotor attachment ring. The adapter has a first detent and is oriented to receive the knob. The apparatus further includes a drive spindle oriented to receive the rotor and the knob along with a plunger slidably disposed within the knob. The drive spindle has a second detent while the plunger has a first groove at an axial location thereof and a second groove at an axial location thereof. The apparatus additionally includes a first adapter moveable element that is retained with the first passage and a first drive spindle moveable element that is retained with the second passage. The adapter moveable element is moveable between an attached position and a released position. The adapter moveable element at least partially enters the first detent of the adapter and contacts the plunger when the adapter moveable element is in the attached position. The drive spindle moveable element is moveable between an attached position and a released position. The drive spindle moveable element at least partially enters the second detent of the drive spindle and contacts the plunger when the drive spindle moveable element is in the attached position. The apparatus also includes a biasing element disposed within the knob.

In accordance with another aspect of the present invention, a method for attaching and releasing a rotor to a centrifuge drive assembly and attaching and releasing a cover to a rotor, comprising: biasing a plunger in a first direction to a start position, wherein said plunger is disposed within a knob and has a first groove and a second groove, wherein the knob comprises at least one adapter moveable element and at least one drive spindle moveable element; actuating the plunger in an opposite, second direction to a fully actuated position; displacing the at least one drive spindle moveable element to at least partially enter the second groove of the plunger; displacing the at least one adapter moveable element to at least partially enter the second groove of the plunger; and inserting the knob into an adapter having a first detent and drive spindle assembly having a second dent.

In accordance with still another aspect of the present invention, a method for connecting a rotor having a rotor ring to a drive spindle of a centrifuge utilizing a an centrifuge attachment and release apparatus that includes a knob assembly and adapter, comprising: connecting the adapter to the knob assembly; inserting the knob assembly through the rotor ring and into a receiver portion of the drive spindle; and rotating the housing in a first direction attaching the adapter to the drive spindle by threaded attachment.

In with yet another embodiment of the present invention, an attachment and release apparatus for use with a centrifuge having a rotor and rotor attachment ring is provided. The apparatus includes a housing means having a first portion and a second portion, wherein the first portion includes a first passage and the second portion includes a second passage.

The apparatus also includes a means for covering a rotor that is disposed around the housing means along with a stationary attachment means connected to the rotor attachment ring. The stationary attachment means has a first detent and is oriented to receive the housing means. The apparatus further includes a means for driving a rotor oriented to receive the rotor along with a actuating means slidably disposed within the housing. The means for driving a rotor has a second detent while the actuating means has a first groove at an axial location thereof and a second groove at an axial location thereof. The apparatus additionally includes a first moveable attachment means that is retained with the first passage and a second moveable attachment means that is retained with the second passage. The first moveable attachment means is moveable between an attached position and a released position. The first moveable attachment means at least partially enters the first detent of the stationary attachment means and contacts the actuating means when the first moveable attachment means is in the attached position. The second moveable attachment means is moveable between an attached position and a released position. The second moveable attachment means at least partially enters the second detent of the rotor drive means and contacts the actuating means when the second moveable attachment means is in the attached position. The apparatus also includes a biasing means disposed within the housing means.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

The present invention provides an apparatus for attaching and releasing a rotor cover to rotor of a centrifuge. The present invention additionally provides an apparatus for attaching and releasing the rotor to a rotor drive assembly. The apparatus is preferably used to securely attach a rotor cover to a centrifuge rotor, preventing the likelihood of the rotor cover erroneously disconnecting during operation. The apparatus is also preferably utilized for securely attaching the rotor to the rotor drive assembly. The apparatus additionally provides a single attachment mechanism that may disconnect or detach both the rotor and the rotor cover, quickly and easily. This enables the centrifuge operator to access the rotor and the samples contained thereon easily and/or attach the rotor to the rotor assembly or remove the rotor from the rotor assembly easily. In the embodiments depicted, the attach and release apparatus is utilized in combination with a laboratory centrifuge. It should be understood, however, that the present invention is not limited in its application to laboratory centrifuges, but, for example, can be used with other devices having rotating components.

Figure 1:
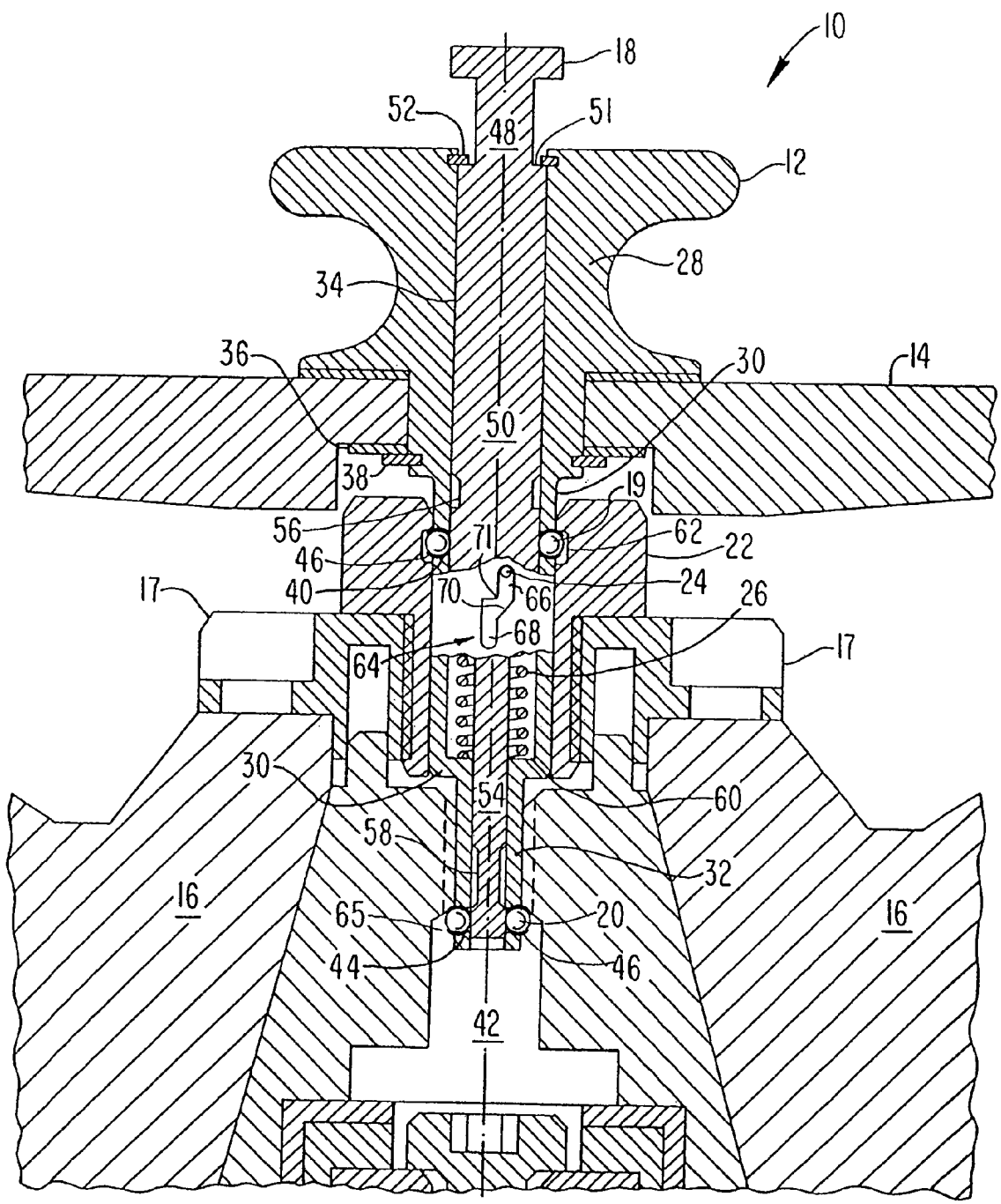
FIG. 1 is a cross-sectional view of an attachment and release apparatus for use with a centrifuge in accordance with an embodiment of the present invention, wherein the rotor is attached to the rotor drive assembly and the rotor cover is attached to the rotor.
Figure 2:
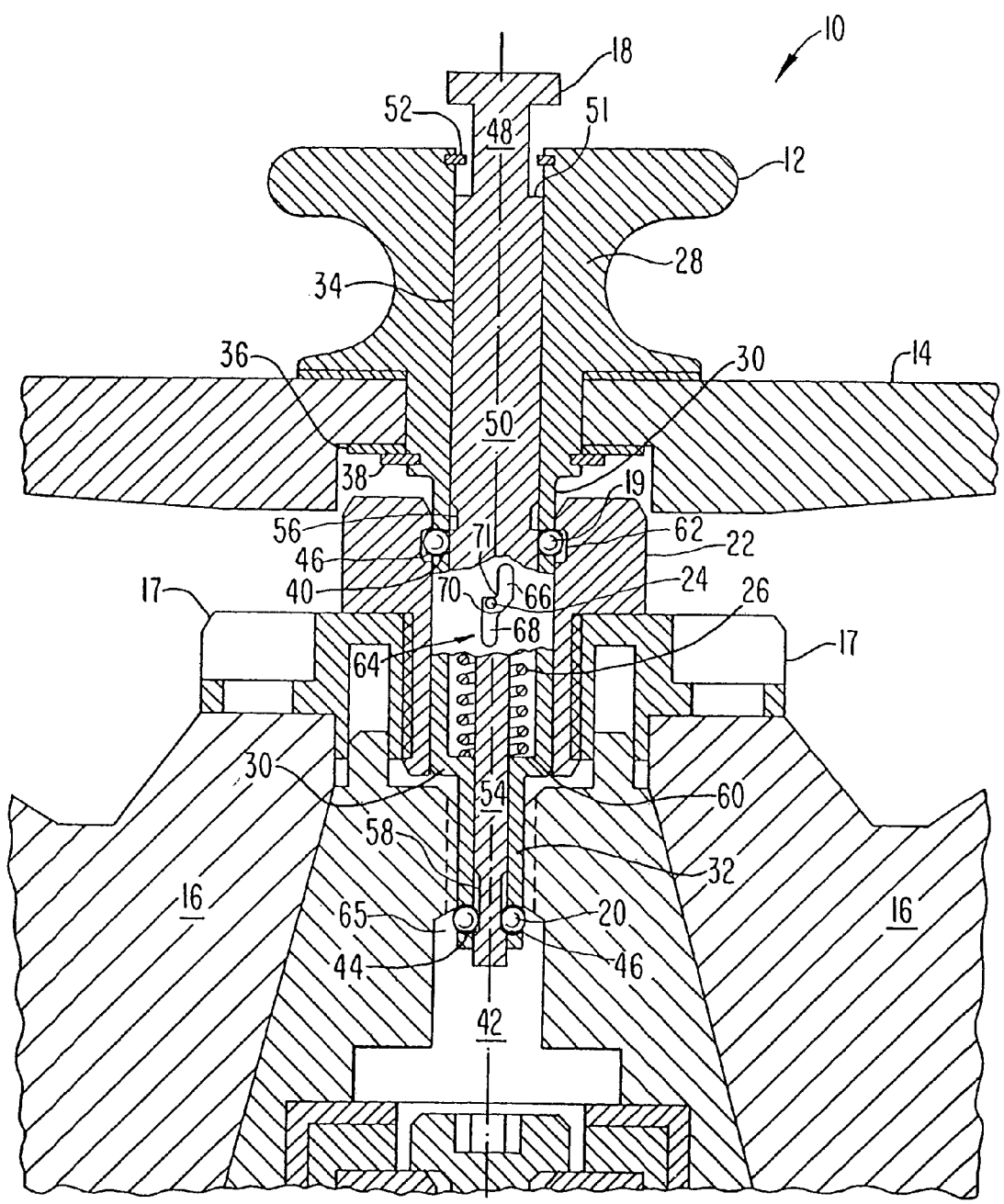
FIG. 2 is a cross-sectional view of the apparatus depicted in FIG. 1 wherein the rotor is detached from the rotor drive assembly.
Figure 3:
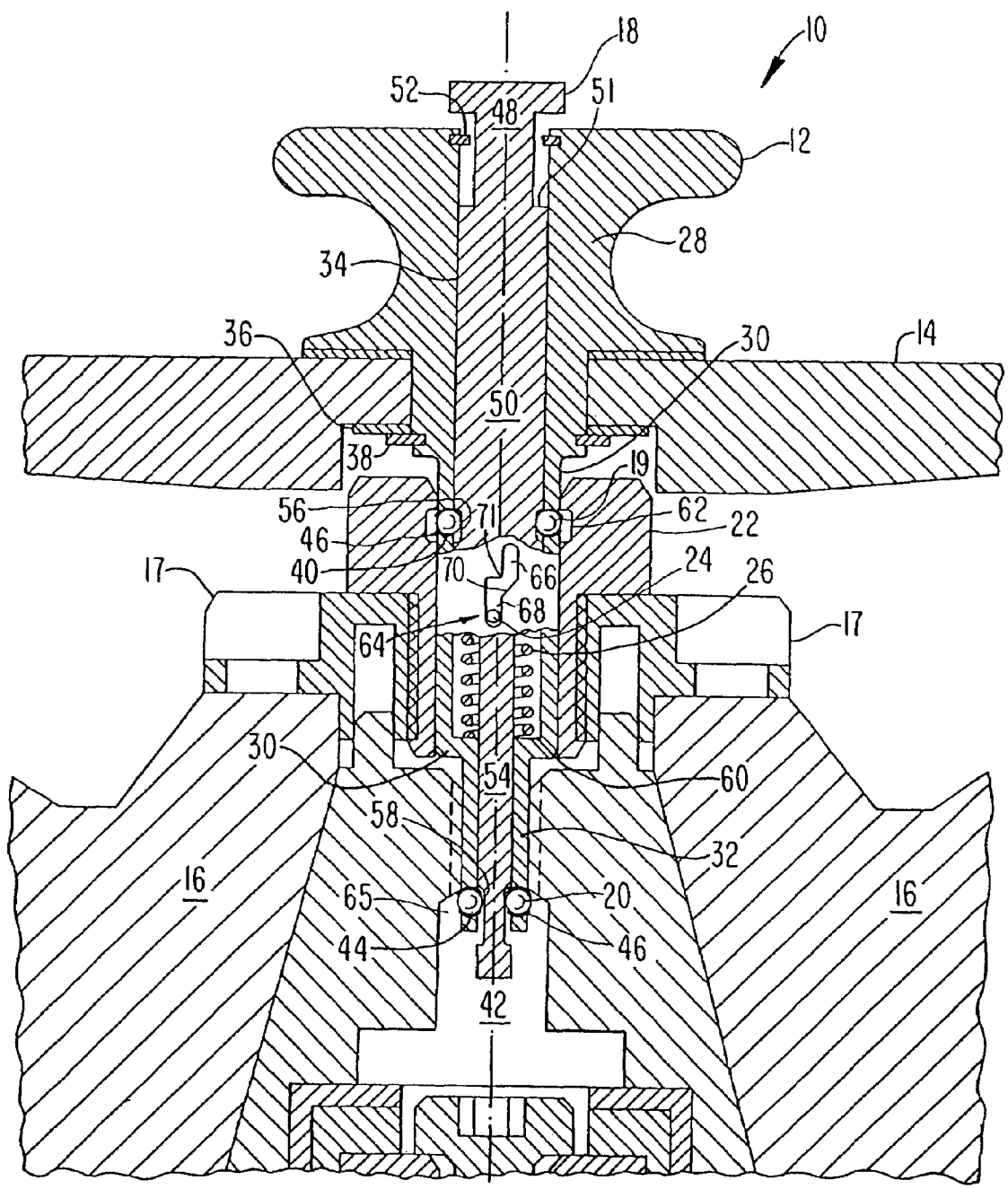
FIG. 3 is a cross-sectional view of the apparatus depicted in FIGS. 1 and 2 wherein the rotor is detached from the rotor drive assembly and the cover is detached from the rotor.

Referring now to the figures wherein like reference numerals indicate like elements, FIGS. 1-3 illustrate presently preferred embodiments of a centrifuge attach and release apparatus, generally designated 10. FIG. 1 shows a cross-sectional view of the centrifuge attach and release apparatus 10 in accordance with an embodiment of the present invention, having a knob or housing 12, a cover 14 and a rotor 16, wherein the cover 14 and the rotor 16 are in the attached position. Whereas FIG. 1 depicts the cover 14 and rotor 16 in the attached position, FIG. 2 depicts the cover 14 in the attached position and rotor 16 in the released position while FIG. 3 depicts both the cover 14 and rotor 16 in the released position.

As shown in FIGS. 1-3, the apparatus 10 additionally includes a plunger 18 disposed within the knob 12, three upper moveable elements 19 (only two are depicted), three lower moveable elements 20 (only two are depicted) and an adapter 22 that is attached to the rotor 16 via a rotor attachment ring 17. The apparatus 10 further includes a pin 24 that extends axially through the plunger 18 via a bore (not pictured) and a biasing element 26 that encircles the plunger 18.

As depicted in FIGS. 1-3, the knob has an upper portion 28, a middle portion 30, a lower portion 32 and a bore 34 that extends from the upper portion to the lower portion. The upper and middle portions 28, 30 of the plunger 18 preferably have a first diameter while the lower portion 32 has a second diameter.

The upper portion 28 of the knob 12 is rotatable in the cover 14 and is retained in position by an insert washer 36 and retaining ring 38. Alternatively, the knob 12 may be integral with the cover 14 or may be attached to the cover by any suitable fastener such as a weld and/or screw.

The middle portion 30 of the knob 12 engages the adapter 22 when both the cover 14 and the rotor 16 are in the attached position, as depicted in FIG. 1, and when only the cover 14 is in the attached position, as depicted in FIG. 2. The middle portion 30 additionally includes upper receptacles or passages 40 that retain the upper moveable elements 19.

The lower portion 32 of the knob 12 engages the rotor drive assembly, including the drive spindle, generally designated, 42 when the rotor is the attached position, as depicted in FIG. 1. The lower portion 32 includes lower receptacles or passages 44 that retain the lower moveable elements 20.

The moveable elements 19, 20 are spherical or circular in shape, for example, attachment balls, and function to attach the cover 14 to the rotor 16 and the rotor 16 to the drive spindle 42, as illustrated in FIG. 1. As depicted in FIG. 1, the upper moveable elements 19 function to attach the cover 14 to the rotor 16 via the adapter 22, while the lower moveable elements 20 function to attach the rotor 16 to the drive spindle 42.

In the embodiments depicted in FIGS. 1-3, preferably three upper attachment balls 19 and three lower attachment balls 20 are utilized to attach cover 14 to the rotor 16, and to attach the rotor 16 to the drive spindle 42, respectively. However, for purposes of clarity, only 2 of each attachment ball 19, 20 are illustrated and herein described. As the name suggests, the attachment balls 19, 20 are preferably solid, spherical components having a diameter, but they can be any shape as long as they function to secure the cover 14 to the rotor 16 and the rotor 16 to the drive spindle 42.

The upper and lower passages 40 and 44, only two of each is illustrated, are disposed at locations along the circumference of middle portion 30 of the knob 18 and along the circumference of the lower portion 32 of the knob 12, respectively. The passages 40, 44 are spaced equidistantly, circumferentially from one another, preferably 120 degrees apart. The aforementioned spacing can vary however depending upon the number of attachment balls.

As depicted in FIGS. 1-3, the passages 40, 44 are preferably bores that penetrate and pierce the width of the respective knob 12 portion wall. The passages 40, 44 enable the attachment balls 19, 20 to engage both the plunger 18 and the adapter 22 and the drive spindle 42. The passages 40, 44 have an open concavity 46 at one end, that has an inner diameter that is less than the outer diameter of the attachment balls 19, 20, that limits balls 19, 20 radial outward movement away from the plunger 18. Preferably, the inner diameter of the open concavity 46 and the outer diameter of the attachment balls 19, 20 is such that the passages prevent the balls 19, 20 from completely exiting the middle portion 30 and lower portion 32 of the knob 12 when the rotor 16 is detached and removed from the drive spindle 42 or the cover 14 is detached and removed from the rotor 16. In addition, the passages 40, 44 allow for radial movement of the balls 19, 20 between the plunger 18 and the adapter 22 and the drive spindle 42.

As illustrated in FIGS. 1-3, the plunger 18 is disposed within the bore 34 of the knob 12, and moves the attachment balls 19, 20 substantially radially through the middle portion 30 and lower portion 32 when actuated. As previously mentioned, the plunger 18 extends from the upper portion 28 of the knob 12, through the middle portion 30 and to the lower portion 32. The plunger 18 slidably engages the knob 12 and generally includes the three aforementioned regions each having a diameter.

The plunger generally has three regions. The first region 48, has a first diameter and extends upward, out of the bore so that the plunger 18 may be accessed by the centrifuge operator. The second region 50 has a second diameter, preferably greater than the first diameter of the first region 48, and combines with the first region 48 to form a shoulder 51. The shoulder 51 contacts a retaining ring 52 and limits the upward translation of the plunger 18. As illustrated in FIGS. 1-3, the second region 50 has an annular groove 56 that extends along the entire circumference of the plunger 18. Alternatively, the annular groove 56 may be circumferentially segmented. The second region 50 additionally has a bore (not pictured) that extends radially through the plunger 18 into which the pin 24 is inserted.

The third region 54 has a third diameter less than the second diameter and is configured and arranged to receive the biasing element 26. In addition, the third region 54 has an annular groove 58 that extends along the entire circumference of the third region 54. Alternatively, the annular groove 58 may be circumferentially segmented.

While the illustrated embodiments depict a plunger 18 having multiple regions with varying diameters, alternative embodiments and/or modifications employing a plunger having a single diameter also fall within the scope of the present invention. For example, apparatuses employed in centrifuges where an upward, translational force is not exerted on the plunger, can be configured utilizing a plunger having a single, constant diameter. Though embodiments utilizing a plunger having a single diameter are described, the utilization of a plunger having multiple diameters is preferred.

The biasing element 26 is preferably a compression spring and encircles the entire circumference of the third region 54 of the plunger 18 and contacts the lower second region 50 of the plunger 18. The compression spring 26 is retained between a second shoulder (not pictured) of the plunger 18 and a base wall 60 of the knob 12. The compression spring 26 functions to exert an axial force on the plunger 18, displacing the plunger 18 upward until the shoulder 51 contacts the retaining ring 52. In this position the plunger 18 forces the attachment balls 19, 20 through the passages 40, 44 and into engagement with the adapter 22 and the drive spindle 42.

The adapter 22 is connected to the rotor attachment ring 17 via screw attachment and is configured to receive the middle portion 30 of the knob 12. The adapter 22 includes an adapter groove and/or detent 62 that can be continuous along the circumference of the adapter 22 or circularly segmented. Alternatively, the rotor attachment ring 17 may be configured with adapter groove and/or detent (not shown) that can be continuous along the circumference of the rotor attachment ring 17 or circularly segmented. In this case the adapter is not required. Alternatively the rotor attachment ring may be integral with the rotor and configured with adapter groove and/or detent.

Similarly, the drive spindle 42 includes a groove and/or detent 65 that can be continuous along the circumference of the drive spindle or circularly segmented, utilized to connect the rotor 16 to the drive spindle 42.

As depicted in FIGS. 1-3, the knob 12 has a groove 64 that axially and circumferentially guides the pin 24 that is attached to the plunger 18. The knob groove 64 includes a first section 66 and a second section 68 that are axially parallel to one another, however they are angularly offset from one another. The sections are connected by a mid-portion 70 having an angular wall on one side and a step or shoulder 71 on the other side. In the embodiments illustrated, the pin 24 is positioned in the second region of the plunger 18 and extends into the knob groove 64.

Embodiments utilizing a continuous adapter groove 62 require the adapter 22 to be threaded into the rotor attachment ring 17 by hand or by utilizing a separate tool. Conversely, embodiments employing a circularly, segmented adapter groove 62 enable the apparatus to function as a tool to thread the adapter 22 into the rotor attachment ring 17. In these embodiments, the knob 12 is inserted into the adapter 22 and the moveable elements 19 engage the adapter grooves. The knob 12 can then be utilized as a tool to thread the adapter 22 into the rotor attachment ring 17.

The above-described components of that attachment apparatus 10, specifically the knob 12, the plunger 18, the attachment balls 19, 20, the adapter 22, and the compression spring 26, are preferably provided by any suitable materials that share similar thermal growth coefficients, for example, stainless steel.

FIGS. 1-3 combine to illustrate operation of the cover and rotor attachment apparatus 10. As shown in FIG. 1, when the centrifuge is in use and the rotor 16 is rotating, the apparatus 10 and its components, including the cover 14 and the rotor 16, are in the attached position. By attached position, it is understood that the knob 12 is inserted into the adapter 22 and the upper moveable elements 19 are engaging the adapter groove and/or detents 62, attaching the cover 14 to the rotor 16. Further, by attached position, it is understood that the lower moveable elements 20 are engaging the drive spindle groove or detent 65, attaching the rotor 16 to the drive spindle 42, and the pin 24 is positioned in the in the first section 66 of the cover attachment groove 64.

In the aforementioned attached position, the spring 26 exerts an upward, axial force on the plunger 18, displacing the plunger 18 upwards to a first or starting position where the shoulder 51 contacts the retaining ring 52. As a result of the translational movement of the plunger 18, the upper attachment balls 19 are displaced substantially radially outward from the middle portion 50 of the plunger 18. In this position, the attachment balls 19 engage the adapter groove 62, thereby attaching the cover 14 to the rotor 16. In addition, as a result of the translational movement of the plunger 18, the lower attachment balls 20 are displace radially outward from the lower portion 54 of the plunger 18. In this position, the attachment balls 20 engage the groove 65, thereby attaching the rotor 16 to the drive spindle 42. The plunger 18 functions to hold the attachment balls 19, 20 in their respective grooves, preventing the likelihood of the cover 14 and the rotor 16 releasing during centrifuge operation.

Referring now to FIG. 2, the centrifuge is not in operation and the lower attachment balls 20 are radially displaced inward towards the plunger 18 in the released position. By released position it is understood that the centrifuge is not in use and the rotor 16 is being removed from the drive spindle 42 or about to be attached to the drive spindle 42. In this position, the plunger 18 has been depressed to a second position or intermediate actuated position and is translated downward such that the annular groove 58 is aligned with the passage 44 in the knob and the drive spindle groove 65, permitting the attachment balls 20 to move inward. As the plunger 18 is translated downward, the pin 24 translates downward also in the first section 66 of the knob groove 64. The pin 24 travels along the angular wall of the cover attachment groove 64, causing the plunger 18 to rotate in a clockwise direction and begin to enter the second section 68 of the knob groove 64. The plunger 18 is then released and the pin contacts the shoulder 71. The shoulder 71 prevents both the pin 26 and the plunger 18 from returning to their respective first positions upon release of the plunger 18, preventing the cover 14 releasing from the rotor 16 prematurely.

The aforementioned translation and rotation of the pin 24, combined with the inward displacement of the attachment balls 20 allows the rotor 16, with the cover 14 still attached thereto, to be either connected to or disconnected from the drive spindle 42. This is desirable, for example, when maintenance of bio-containment of the rotor is desired and/or hands free connection or disconnection of the rotor 16 is desired.

Referring now to FIG. 3, again, the centrifuge is not in operation, and both the lower attachment balls 20 and the upper attachment balls are radially displaced inward towards the plunger 18, both in the released position. By released position, it is understood that the centrifuge is not in operation and the cover 14 can be removed from, or attached to, the rotor 16, and as previously described, the rotor 16 is not attached to the drive spindle 42. In this position, the plunger is further translated to a third position fully actuated position, such that the annular groove 56 is aligned with the knob passage 40 and the adapter groove 62, enabling the upper attachment balls 19 to move inward. Again, as the plunger 18 is further translated down, the pin 26 translates downward into the second section 68 of the cover attachment groove 64.

The aforementioned inward displacement of the upper attachment balls 19 allows the cover 14 to be attached to, or detached from, the rotor 16. Moreover, displacement of the upper attachment balls, combined with displacement of the lower attachment balls 20 as previously described, enables both the rotor 16 and the cover 14 to be attached and removed easily and efficiently.

During operation, the centrifuge operator first loads tubes filled with samples into the cavities of the rotor 16. The plunger 18 is in the upper position shown in FIG. 1 with the balls 19 and 20 being held radially outward by the plunger 18.

In the aforementioned position, the operator can either attach the adapter 22 to the rotor 16 by hand or place it on the middle portion 30 of the knob 12 and depress the plunger 18 all the way down until the pin 24 is in the lower section 68 of the knob groove 64. In this position, the operator can then slide the adapter 17 upward until the adapter groove 62 aligns with the upper passage 40. The operator then releases the plunger 18 which subsequently moves axially upward due to the force from the compression spring until the pin 24 contacts the shoulder 71. As a result of the upward translation of the plunger 18, the balls 19 are forced outward into the adapter grooves 62 attaching the adapter 22 to the knob 12.

The operator may also use the knob 12 as an attachment tool to thread the adapter 22 into the rotor attachment ring 17, thereby attaching the cover to the rotor as shown in FIG. 2. Note that the knob groove 64 is configured to thread the adapter 22 counter-clockwise into the rotor attachment ring 17. Also note that when the plunger is in this position the lower balls 20 are free to move into the plunger groove 58 so that the knob 12 can be inserted into the drive spindle 42.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for attaching and releasing a rotor to a centrifuge drive assembly and attaching and releasing a cover to a rotor, comprising:

biasing a plunger in a first direction to a start position, wherein said plunger is disposed within a knob and has a first groove and a second groove, wherein the knob comprises at least one adapter moveable element and at least one drive spindle moveable element;

actuating the plunger in an opposite, second direction to a fully actuated position;

displacing the at least one drive spindle moveable element to at least partially enter the second groove of the plunger;

displacing the at least one adapter moveable element to at least partially enter the second groove of the plunger; and inserting the knob into an adapter comprising a first detent and drive spindle assembly comprising a second dent.

2. The method according to claim 1, further comprising:

actuating the plunger in the first direction to an intermediate actuated position; and displacing the at least one adapter moveable element to contact the plunger and at least partially enter the first detent, attaching the cover to the rotor.

3. The method according to claim 2, further comprising:
actuating the plunger further in the first direction to return to the position; and
displacing the at least one drive spindle moveable element to contact the plunger and at least partially enter the second detent, attaching the rotor to the drive spindle.

4. The method according to claim 3, further comprising:
actuating the plunger in the second direction to the intermediate actuated position;
displacing the at least one drive spindle moveable element to at least partially to enter the second groove of the plunger; and
releasing the rotor from the drive spindle assembly.

5. The method according to claim 4, further comprising:
actuating the plunger in the second direction to the fully actuated position;
displacing the at least one adapter moveable element to at least partially enter the first groove of the plunger; and
releasing the cover from the rotor.

6. A method for attaching and releasing a rotor to a centrifuge drive assembly and attaching and releasing a cover to a rotor, comprising:
biasing a plunger in a first direction to a start position, wherein said plunger is disposed within a knob and has a first groove and a second groove, wherein the knob comprises at least one adapter moveable element and at least one drive spindle moveable element;
actuating the plunger in an opposite, second direction to a fully actuated position;
displacing the at least one drive spindle moveable element to at least partially enter the second groove of the plunger;
displacing the at least one adapter moveable element to at least partially enter the second groove of the plunger; and
inserting the knob into an adapter and drive spindle assembly.

7. The method according to claim 6, further comprising:
actuating the plunger in the first direction to an intermediate actuated position; and
displacing the at least one adapter moveable element to contact the plunger, attaching the cover to the rotor.

8. The method according to claim 6, further comprising:
actuating the plunger further in the first direction to return to the position; and
displacing the at least one drive spindle moveable element to contact the plunger, attaching the rotor to the drive spindle.

9. The method according to claim 6, further comprising:
actuating the plunger in the second direction to the intermediate actuated position;
displacing the at least one drive spindle moveable element to at least partially to enter the second groove of the plunger; and
releasing the rotor from the drive spindle assembly.

10. The method according to claim 6, further comprising:
actuating the plunger in the second direction to the fully actuated position;
displacing the at least one adapter moveable element to at least partially enter the first groove of the plunger; and
releasing the cover from the rotor.

11. An attachment and release method for use with a centrifuge including a rotor and rotor attachment ring, comprising:
disposing a cover around a knob comprising a first portion and a second portion, wherein said first portion includes a first passage and said second portion includes a second passage;
releasably connecting an adapter to the rotor attachment ring, said adapter comprising a first detent and oriented to receive said knob;
orienting a drive spindle including a second detent, to receive the rotor;
slidably disposing a plunger comprising a longitudinal axis, within said knob, said plunger comprising a first groove at a first axial location thereof and including a second groove at a second axial location thereof;
retaining a first adapter moveable element within said first passage so that said adapter moveable element is moveable between an attached position and a released position, wherein said adapter moveable element at least partially enters said first detent and contacts said plunger when said adapter moveable element is in the attached position;
retaining a first drive spindle moveable element within said second passage so that said drive spindle moveable element is moveable between an attached position and a released position, wherein said drive spindle moveable element at least partially enters said second detent and contacts said plunger when said drive spindle moveable element is in the attached position; and
disposing a biasing element within said knob and contacts said plunger.

12. The method according to claim 11, wherein said knob further comprises a groove wherein said plunger further comprises a pin that extends radially through said plunger at an axial location thereof such that a portion of said pin rests in said knob groove.

13. The method according to claim 11, wherein said groove comprises a first section, a second section and a step.

14. The method according to claim 13, wherein said plunger is actuated to a first position and said drive spindle moveable element at least partially enters said second groove of said plunger when said drive spindle moveable element is in the released position, and wherein said pin contacts said step when said plunger is in said first position.

15. The method according to claim 14, wherein said plunger is actuated to a second position and said adapter moveable element at least partially enters said first groove of said plunger when said adapter moveable element is in the released position, and wherein said pin is displaced into said second section of said groove when said plunger is in said second position.

16. The method according to claim 11, wherein said first groove of said plunger is annular and said second groove of said plunger is annular.

17. The method according to claim 11, wherein said adapter is connected to the rotor attachment ring by screw attachment.

18. The method according to claim 11, wherein said first passage has an open concavity at one end and said second passage has an open concavity at one end.

19. The method according to claim 11, wherein first detent is formed circumferential and said second detent is formed circumferential.

* * * * *

UNITED STATES PATENT AND TRADEMARK OFFICE
CERTIFICATE OF CORRECTION

PATENT NO.         : 7,464,450 B2
APPLICATION NO.    : 11/144940
DATED              : December 16, 2008
INVENTOR(S)        : Raymond Gary Potter It is certified that error appears in the above-identified patent and that said Letters Patent is hereby corrected as shown below:

Title Page In the Abstract (57), cover page, change "The apparatus includes a knob, a cover wherein the knob has a plunger disposed therein." to --The apparatus includes a knob and a cover, wherein the knob has a plunger disposed therein.--.

Title Page In Abstract (57), cover page, change "passage located on the knob and least one drive spindle" to --passage located on the knob and at least one drive spindle--.

In column 1, line 15, change "a rotor that support samples" to --a rotor that supports samples--.

In column 1, line 27, change "spinning parts in the chamber:" to --spinning parts in the chamber.-- as appears in the Specification at page 1.

In column 2, line 52, change "spindle assembly having a second dent." to --spindle assembly having a second detent.--.

In column 2, line 55, change "centrifuge utilizing a an centrifuge" to --centrifuge utilizing a centrifuge--.

In column 7, line 5, change "is positioned in the in the first section" to --is positioned in the first section--.

In column 7, line 17, change "are displace radially outward from the lower portion" to --are radially displaced outward from the lower portion--.

In column 7, line 62, change "to a third position fully actuated position," to --to a third, fully actuated position,--.

UNITED STATES PATENT AND TRADEMARK OFFICE
CERTIFICATE OF CORRECTION

PATENT NO.       : 7,464,450 B2
APPLICATION NO.  : 11/144940
DATED            : December 16, 2008
INVENTOR(S)      : Raymond Gary Potter It is certified that error appears in the above-identified patent and that said Letters Patent is hereby corrected as shown below:

In claim 1, column 8, line 60, change "drive spindle assembly comprising a second dent." to --drive spindle assembly comprising a second detent.--.

Signed and Sealed this

First Day of December, 2009

David J. Kappos
*Director of the United States Patent and Trademark Office*